(12) United States Patent
Takahashi et al.

(10) Patent No.: US 6,939,109 B2
(45) Date of Patent: Sep. 6, 2005

(54) PUMP CONTROL SYSTEM

(75) Inventors: Hiroshi Takahashi, Musashino (JP); Keisuke Tani, Tokyo (JP); Hiromichi Kosaka, Tokyo (JP); Shigehiro Yoshida, Tokyo (JP)

(73) Assignees: Yokogawa Electric Corporation, Tokyo (JP); Asahi Kogyosha Co., Ltd., Tokyo (JP)

( * ) Notice: Subject to any disclaimer, the term of this patent is extended or adjusted under 35 U.S.C. 154(b) by 97 days.

(21) Appl. No.: 10/197,518

(22) Filed: Jul. 18, 2002

(65) Prior Publication Data

US 2003/0063978 A1 Apr. 3, 2003

(30) Foreign Application Priority Data

Sep. 28, 2001 (JP) .......................... 2001-300146

(51) Int. Cl.[7] .............. F04B 41/06; F25B 7/00
(52) U.S. Cl. .............. 417/3; 417/14; 417/18; 417/43; 62/175; 62/228.3
(58) Field of Search .................. 417/3, 14, 18, 417/43; 62/510, 175, 228.3, DIG. 17

(56) References Cited

U.S. PATENT DOCUMENTS

| | | | | |
|---|---|---|---|---|
| RE27,148 E | * | 6/1971 | Schaub | 417/6 |
| 6,370,896 B1 | * | 4/2002 | Sakakibara et al. | 62/201 |
| 6,428,282 B1 | * | 8/2002 | Langley | 417/2 |
| 6,579,067 B1 | * | 6/2003 | Holden | 417/2 |

* cited by examiner

*Primary Examiner*—Charles G. Freay
(74) *Attorney, Agent, or Firm*—Westerman, Hattori, Daniels & Adrian, LLP

(57) ABSTRACT

The present invention provides a system which comprises primary supply pumps and secondary supply pumps and controls pressurized water supply systems, air-conditioning systems, or the like that supply chilled water or hot water using these pumps. In the present invention, calculation is carried out based on measurement signals obtained by measuring pressure, flow rate, open rate of valves, etc. by providing sensors in supply channels.

14 Claims, 7 Drawing Sheets

|     | PATTERN1 | PATTERN1 | PATTERN1 | PATTERN1 | PATTERN1 | ..... |
|-----|----------|----------|----------|----------|----------|-------|
| K0  | 2        | 1        |          |          |          |       |
| K1  | 3        | 2        |          |          |          |       |
| K2  | 8        | 5        |          |          |          |       |
| n   | 2        | 2        |          |          |          |       |

$P1 = K0 + K1 \cdot Q + K2 \cdot Q^n$

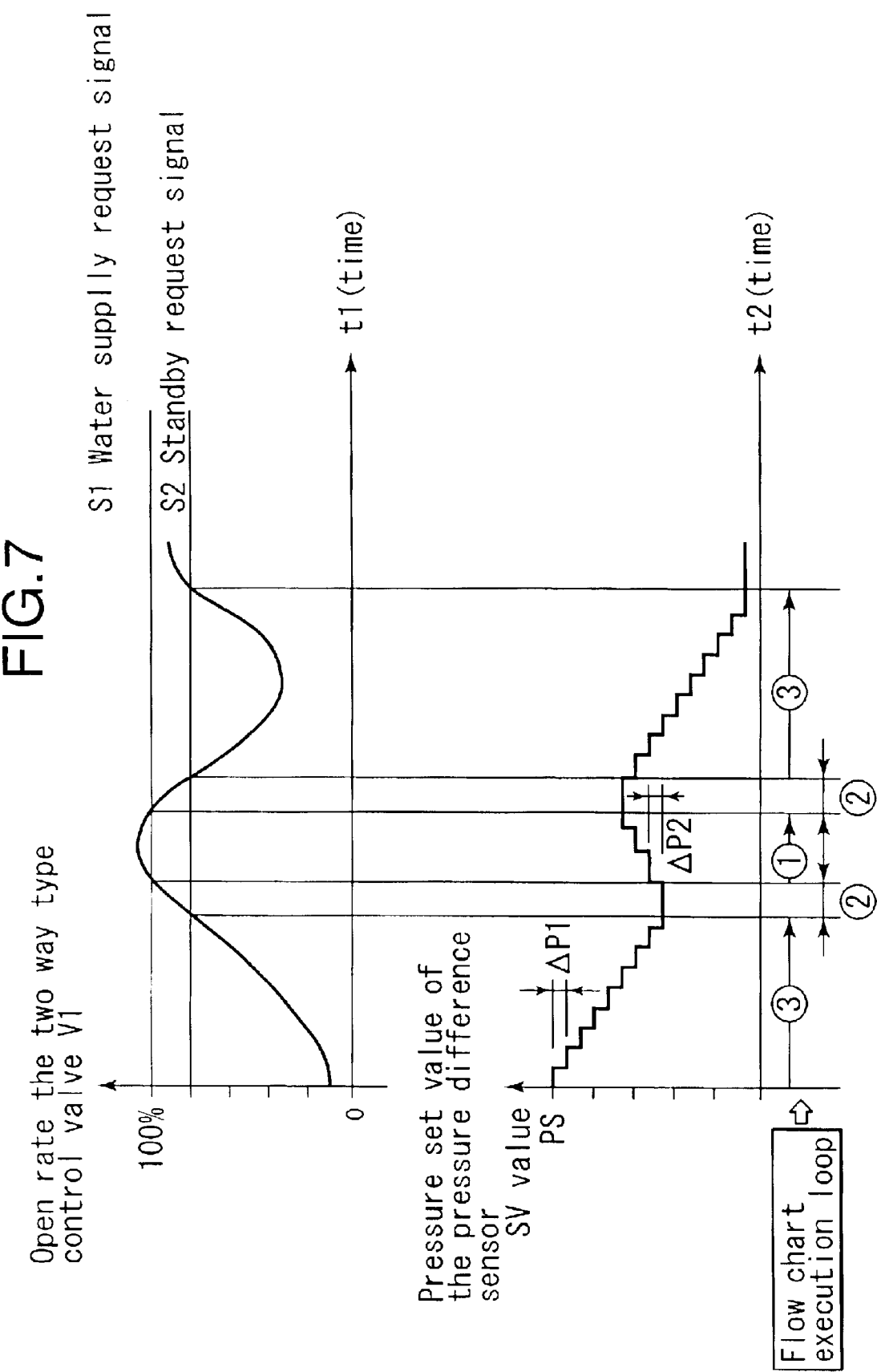

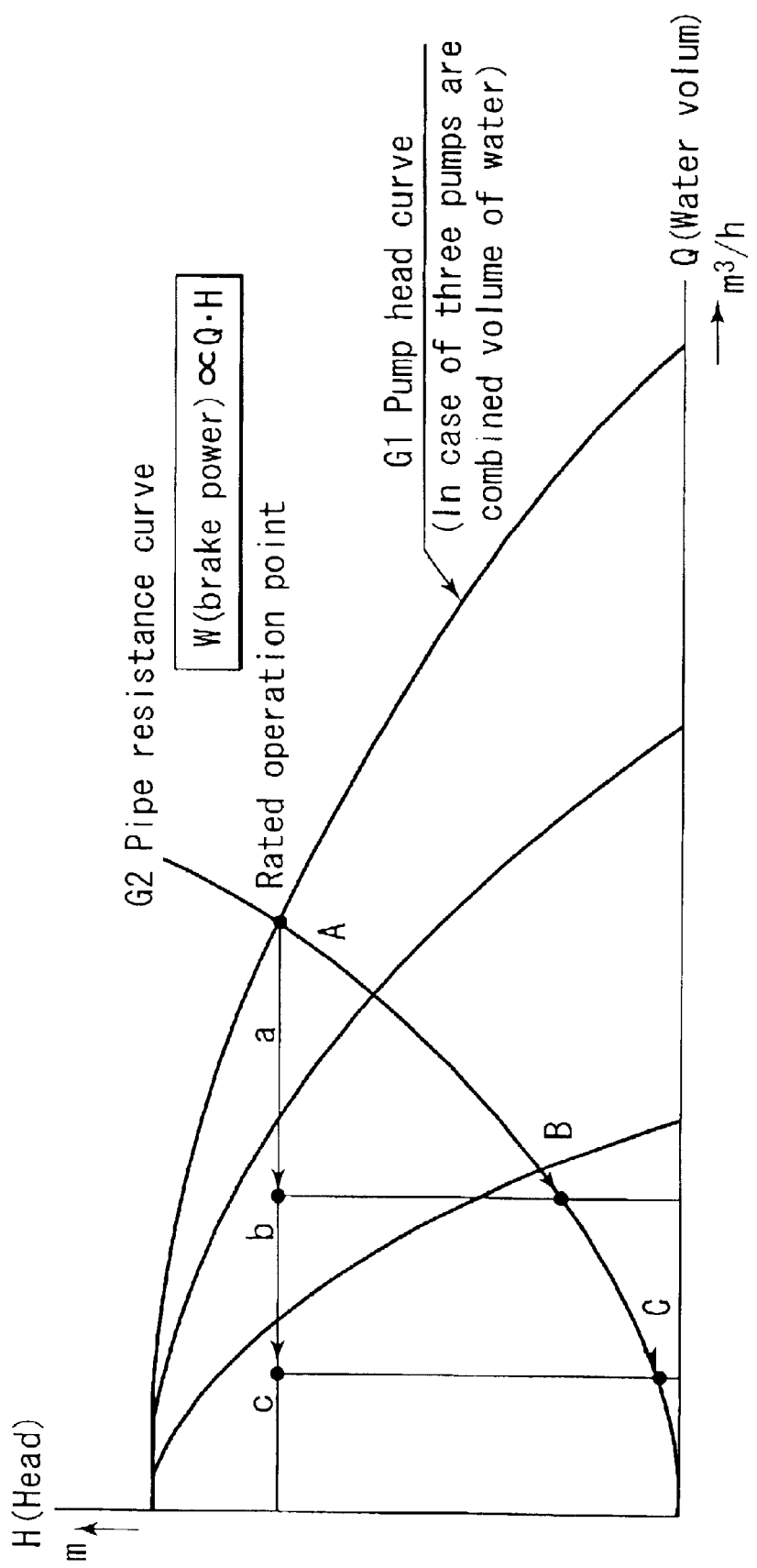

PUMP CONTROL SYSTEM

BACKGROUND OF THE INVENTION

1. Field of the Invention

The present invention relates to a pump control system that has an electric energy-saving effect, used for pressurized water pump systems, air-conditioning systems, and the like.

2. Description of the Prior Art

FIG. 1 is a drawing illustrating the configuration of an example of conventional pump control system generally used from the past, in which a pump control system is used for pressurized water pump system.

In FIG. 1, primary supply pumps 1 supply chilled water or hot water from return header 2 to primary supply header 4 via refrigerators or heat pump chillers or boilers 3.

Secondary supply pumps 5 are provided with inverters 6 and supply chilled water or hot water to secondary supply header 7 from primary supply header 4.

Flow sensor 8 measures the flow rate of chilled water or hot water supplied to return header 2 via two-way type control valves 9 and heat exchangers 11 from secondary supply header 7.

Pressure difference sensor 12 measures the differential pressure of chilled water or hot water between secondary supply header 7 and return header 2.

Controller for controlling the number of operating pumps 13 issues operation commands to secondary supply pumps 5 so that the optimum number of operating pumps is obtained using values measured by flow sensor 8 and pressure difference sensor 12.

In the above configuration, chilled water or hot water delivered from primary supply pumps 1 is supplied to heat exchangers 11 at the secondary use point by secondary supply pumps 5.

The flow rate of the secondary circulating flow is variable because two-way type control valves 9 are controlled depending on the heat exchanging amounts required by heat exchangers 11.

In this case, controller for controlling the number of operating pumps 13 issues operation commands to secondary supply pumps 5 so that the optimum number of operating pumps is obtained by detecting flow rate with flow sensor 8, and at the same time sends a rotational frequency control signal to inverters 6 so that the required pre-set differential pressure is obtained by detecting the differential pressure between secondary supply header 7 and return header 2 with pressure difference sensor 12.

As a result, a pump control system that can reduce electric power consumption is obtained.

However, there are the following problems in such conventional pump control systems:

(1) The control systems are rotational frequency control systems at a constant pressure that detect the differential pressure between secondary supply header 7 and return header 2 or the pressure at secondary supply header 7 without directly detecting the required secondary water flow.

(2) They are rotational frequency control systems that, although they have an energy-saving effect accompanying the reduction of water flow, have little energy-saving effect for the head which reduces in proportion to the flow rate ratio to the second power, because they are rotational frequency control systems at a constant pressure.

(3) In addition, if the pressure setup happens to be lower, they may stabilize while the flow rate is too low for the load.

(4) The adjustment setup can be done only at the installation site. Also, since they have no function for storing historical data, adjustment to the optimum value requires separate monitoring and is difficult.

(5) Since the peak load timing varies, changes of control system parameters for responding to those timings, or for load variation due to changes of parameters in production equipment availability factor and others, are designed to be operated manually at an installation site or within the premises, in other words, operability is not good.

(6) Calculation of the energy-saving effect is laborious and time-consuming because in order to acquire data at an installation site, it is necessary to provide measuring instruments, to perform measurement, to bring back the data obtained, and then to calculate the energy-saving effect.

SUMMARY OF THE INVENTION

The present invention is intended to overcome the above-mentioned problems and to provide a pump control system having an electric power-saving effect.

BRIEF DESCRIPTION OF DRAWINGS

FIG. 1 is a drawing illustrating the configuration of an example of conventional pump control systems generally used since the past.

FIG. 2 is a drawing illustrating an essential part of the configuration of a pump control system in an embodiment of the present invention.

FIG. 3 is a drawing illustrating operations of the invention shown in FIG. 2.

FIG. 4 is another drawing illustrating operations of the invention shown in FIG. 2.

FIG. 5 is a drawing illustrating an essential part of the configuration of a pump control system in another embodiment of the present invention.

FIG. 6 is a drawing illustrating operations of the invention shown in FIG. 5.

[FIG. 7]

FIG. 7 is another drawing illustrating operations of the invention shown in FIG. 5.

[FIG. 8]

FIG. 8 is another drawing illustrating operations of the invention shown in FIG. 5.

DESCRIPTION OF THE PREFERRED EMBODIMENTS

The present invention will now be described in detail with reference to the drawings. The present invention will be described for each embodiment.

(Embodiment 1)

In the following, the present invention is described using the drawings for the first embodiment.

Figure 2:
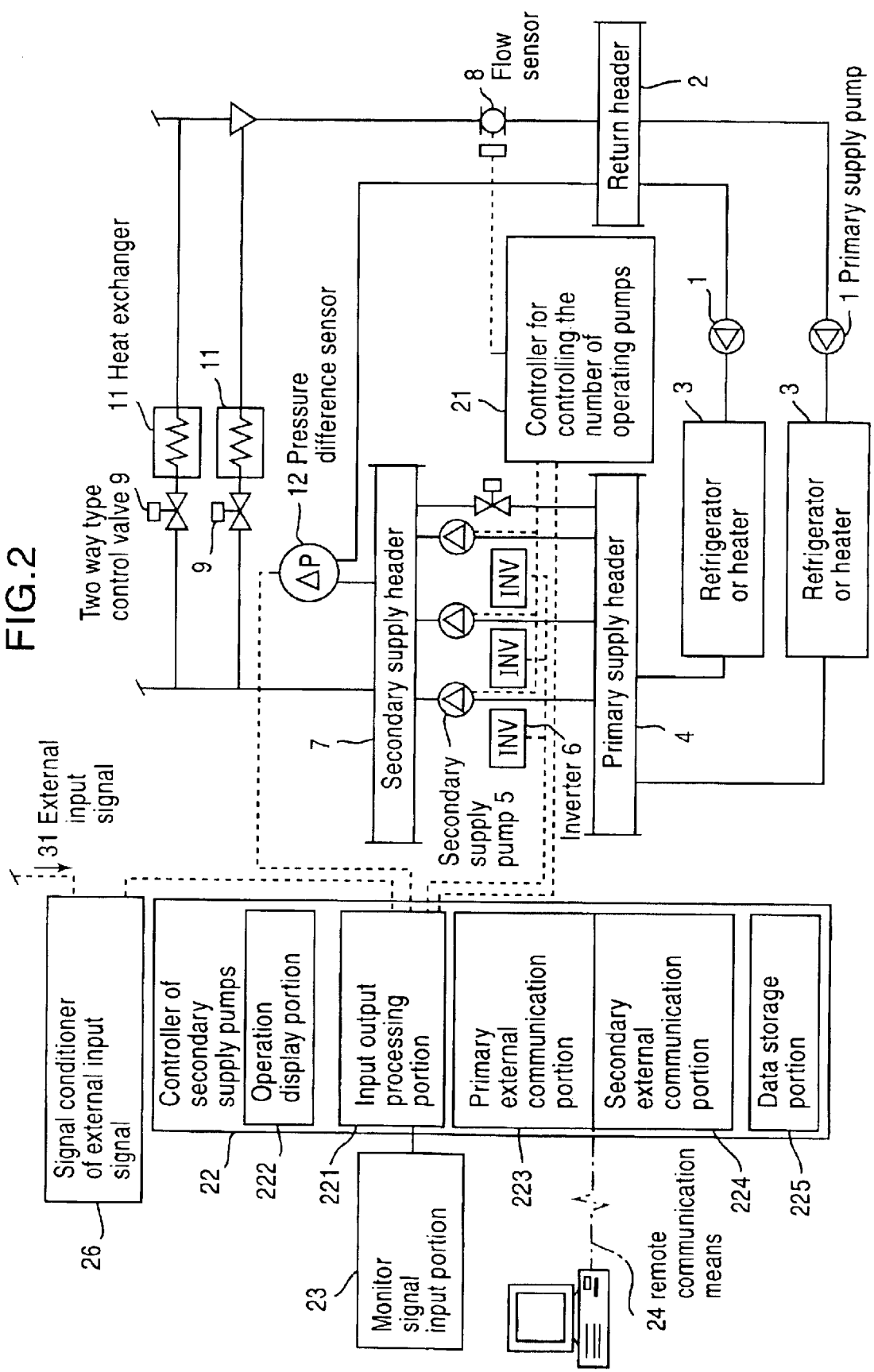
[FIG. 2]
Figures 3, 4:
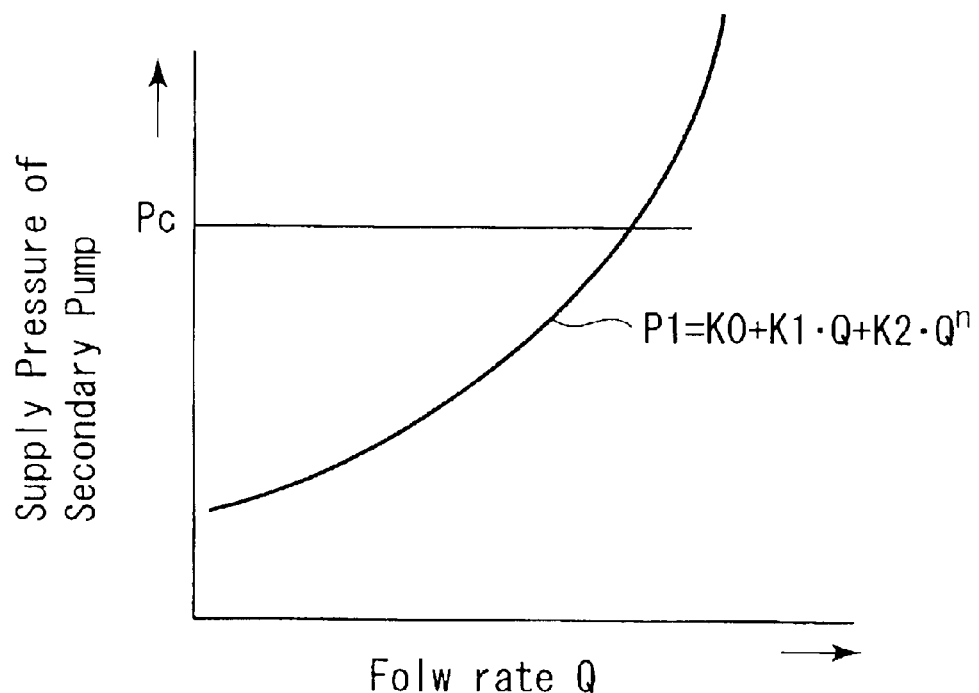
[FIG. 3]
[FIG. 4]

FIG. 2 is a drawing illustrating an essential part of the configuration of a pump control system in an embodiment of the present invention. FIG. 3 and FIG. 4 are drawings illustrating operations of the system shown in FIG. 2. This embodiment is for a pump control system used for a pressurized water pump system.

Figure 1:
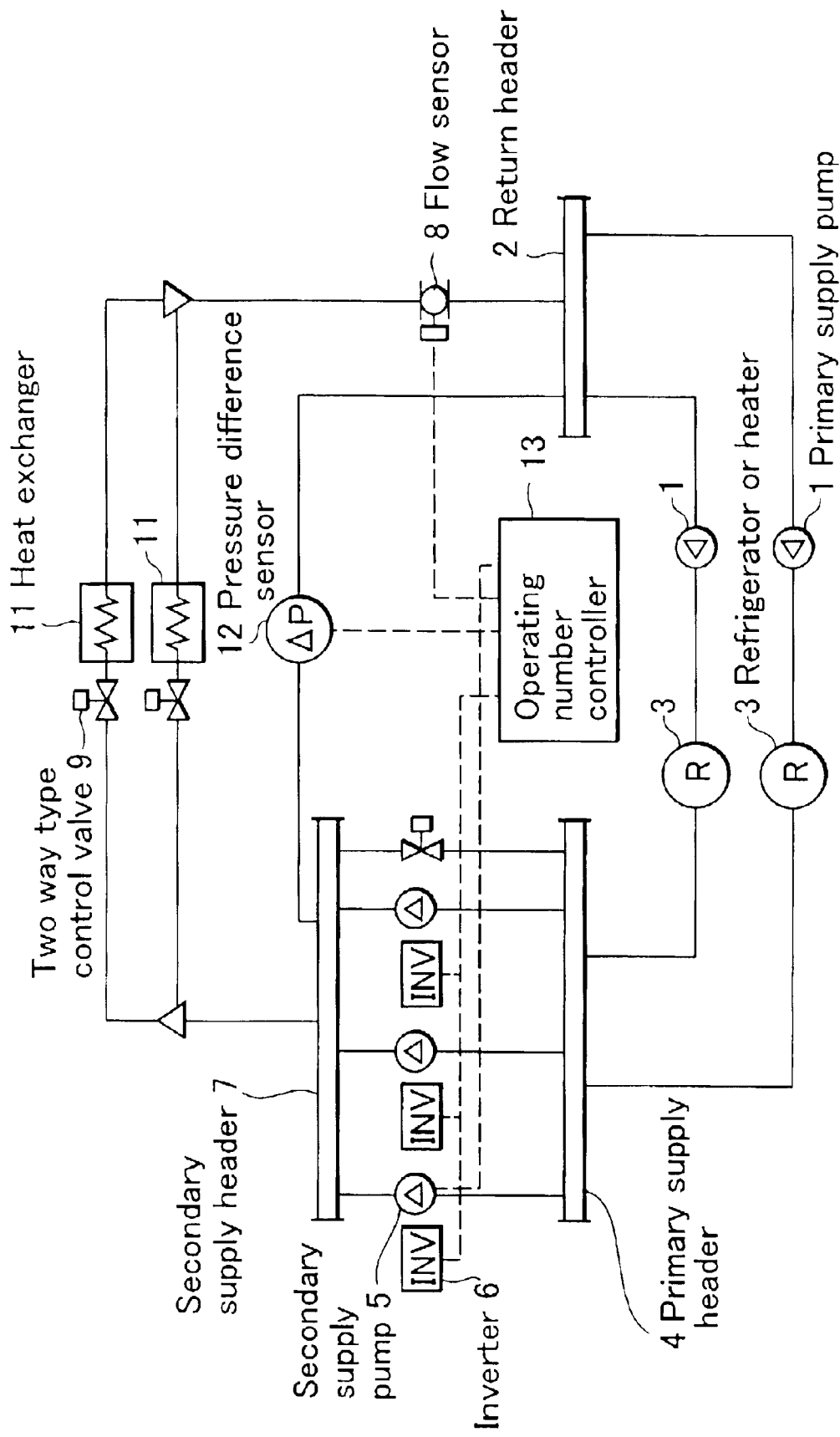
[FIG. 1]

In these figures, the components having the same symbols as those shown in FIG. 1 indicate the identical functions. In the following, only the parts different from FIG. 1 will be described.

Controller for controlling the number of operating pumps 21 issues operation commands to secondary supply pumps 5 so that the optimum number of operating pumps is obtained using the value measured with flow sensor 8.

Controller 22 of secondary supply pumps contains input-output processing portion 221 that determines the rotational frequency (revolution) of inverters 6 by selecting numerical values of fixed resistance K0 of the entire system, pipeline constants K1 and K2, and constant n using the formula of head of friction loss based on external input signal 31, and by calculating supply pressure P1 from these values and a signal measured with flow sensor 8.

Monitor signal input portion 23 inputs monitor input signals to input-output processing portion 221.

Operation display portion 222, provided in controller 22, displays the operating status.

Primary external communication portion 223, provided in controller 22, displays the operating status in a remote place via remote communication means 24.

Secondary external communication portion 224, provided in controller 22, changes the settings of parameters necessary for operation from a remote place via remote communication means 24.

In the present case, the Internet is utilized as remote communication means 24.

The data storage portion, provided in controller 22, stores various data.

External operation terminal 25 is connected controller 22 through remote communication means 24.

Signal conditioner 26 carries out conversion of external input signal 31.

Next, operations of the system of the present invention configured as mentioned above will be described.

Control of the number of operating secondary supply pumps 5 is performed by controller for controlling the number of operating pumps 21. Rotational frequency control of secondary supply pumps 5 is performed as described below.

The following calculation is carried out in input-output processing portion 221 using flow rate signal Q by flow sensor 8 given through controller for controlling the number of operating pumps 21 to determine supply pressure P1 from secondary supply pumps:

$$P1 = K0 + K1 \cdot Q + K2 \cdot Q^n \quad (1)$$

Where P1: Supply pressure from secondary supply pumps
K0: Fixed resistance of the entire system
K1: Pipeline constant
K2: Pipeline constant
Q: Supply flow rate from secondary supply pumps
n: Constant based on the formula of head of friction loss (normally 2)

Based on supply pressure value P1 from secondary supply pumps determined by equation (1) and the discharge pressure measured with pressure difference sensor 12, input-output processing portion 221 carries out PID operation and outputs a rotational frequency control signal to inverters 6.

In the meantime, in pressurized water pump systems or practically, for example, in an air-conditioning system, a peak load is generated early in the morning in winter and in the afternoon in summer. In addition, if there is production equipment, changes in flow rate of chilled/hot water and/or cooling water due to load changes occur depending on the operating status.

Accordingly, there are optimum values every time for parameters (K0, K1, K2, and n) depending on load changes and load patterns.

Parameters (K0, K1, K2, and n) should be selected based on external input signal 31, for example, outside air temperature input signal or production equipment power consumption input signal, or from various tables stored in data storage portion 225, e.g., seasonal change table, availability factor change table, or load change table.

The rotational frequency control signal is output to inverters 6 by selecting optimum parameters (K0, K1, K2, and n) and performing calculations in input-output processing portion 221.

Specifically, the rotational frequency control signal is output to inverters 6 by changing the settings for fixed resistance K0 for the entire system, pipeline constants K1 and K2, and the constant n based on the formula of head of friction loss (normally 2), input from operation display portion 222, in input-output processing portion 221 to obtain optimum values, based on external input signal 31 (outside air temperature, seasonal changes, availability factor changes, and load changes).

Substitution of values K0, K1, K2, and n based on external input signal 31 is, for example, carried out as shown below.

As shown in FIG. 3, pattern 1, pattern 2, pattern 3, pattern 4, etc. are determined in advance corresponding to the combination of numerical values of K0, K1, K2, and n.

If it is assumed that seasonal changes are adopted as external input signal 31, numerical values of K0, K1, K2, and n are determined by dividing the seasonal changes into spring, summer, autumn, and winter as shown below.

For example, spring→pattern 1,
For example, summer→pattern 2,
For example, autumn→pattern 1, and
For example, winter→pattern 3.

If it is assumed that seasonal changes are adopted as external input signal 31, numerical values of K0, K1, K2, and n are determined by dividing the seasonal change into months as shown below.

For example, January→pattern 1,
For example, February→pattern 2,
. . . ,
. . . .

For seasonal changes as described above, these values can be used as tables because the input signals are regarded as fixed ones.

Next, if it is assumed that the outside air temperature input signals are, for example, adopted as external input signal 31, numerical values of K0, K1, K2, and n are determined by setting as shown below.

For example,
outside air temperature 0 to 5° C. (including)→pattern 1,
outside air temperature 5 to 10° C. (including)→pattern 2,
outside air temperature 10 to 15° C. (including)→pattern 3,
. . . ,
. . . .

If it is assumed that, for example, the input signals of production equipment power consumption input signals are adopted as external input signal 31, numerical values of K0, K1, K2, and n are determined by setting as shown below.

For example, power consumption 100 to 200 kWh (including)→pattern 1, power consumption 200 to 300 kWh (including)→pattern 2,

. . . ,

. . . .

In the cases of such outside air temperature or production equipment power consumption, tables cannot be used and input signals are separately required.

Next, as shown in FIG. 4, the setup of prescribed constant pressure or prescribed constant frequency and prescribed time is input at operation display portion 222 at the start of operation of secondary supply pumps 5.

In practice, for example, a prescribed constant pressure #.## MPa is applied for a prescribed time ## minutes from the start of operation of secondary supply pumps 5. That is, the discharge pressure P of secondary supply pumps 5 is set to constant Pc only for the prescribed time from the start of operation.

As a result, even if supply pressure P1 from secondary supply pumps that is a result of predictive calculation of pipeline resistances is low, a pump control system of better performance is obtained which does not stabilize at a water flow lower than the required water flow, thus preventing the possibility of stabilization at a lower flow rate.

Also, startup operation of a pressurized water pump system can be established earlier.

Second, supply pressure P1 from the secondary supply pumps is expressed as shown below as described above.

$$P1 = K0 + K1 \cdot Q + K2 \cdot Q^n$$

The result of calculation using the input Q and set parameters K0, K1, K2, and n is P1 and thus if parameters K0, K1, K2, and n are set too low, the system may stabilize at a low flow rate.

The rotational frequency of above-mentioned inverters is determined so that a prescribed amount is added to the value of supply pressure P1 calculated in input-output processing portion 221 for a prescribed period at every prescribed time interval.

In practice, for example, a prescribed pressure #.## MPa to be increased is added for a prescribed period ## minutes at every prescribed time interval ### minutes. That is, the value of supply pressure P1 from the secondary supply pumps is raised only for a certain period at every certain time interval.

In this case, the setup of a pressure or frequency to be raised and prescribed period and interval is input at operation display portion 222.

As a result, even if supply pressure P1 from secondary supply pumps that is a result of predictive calculation of pipeline resistances is low, a pump control system of better performance is obtained which does not stabilize at a water flow lower than the required water flow, thus preventing the possibility of stabilization at a lower flow rate.

If the monitor input is used, monitor signal input portion 23 inputs a monitor input signal to input-output processing portion 221 and stores data in data storage portion 225, as well as makes operation display portion 222 display a trend-graph and numerical values.

In the case of remote control, the monitor input signal and various parameter values are monitored in external operation terminal 25 located in a remote place after passing through remote communication means 24 from primary and secondary external communication portions 223 and 224, and at the same time external operation terminal 25 changes the settings for the values to be set.

In addition, cost calculation for the energy-saving effect can also be done in external operation terminal 25.

As a result:

(1) A pump control system that can ensure a highly accurate energy-saving system is obtained, because controller 22 of secondary supply pumps is provided which has input-output processing portion 221 determining the rotational frequency of the inverters by selecting numerical values of fixed resistance K0 of the entire system, pipeline constants K1 and K2, and the constant n determined from the formula of head of friction loss based on external input signal 31 or tables in data storage portion 225, and calculating a supply pressure using the above numerical values and a signal obtained by the measurement with flow sensor 8.

(2) Since the proposed system only requires increasing the number of input-output processing portion 221 and can utilize the existing controller for controlling the number of operating pumps 21 for extending a conventional pump control system, a low-cost pump control system whose extension can easily be done is obtained.

(3) If the outside air temperature input signal is used as the external input signal, a pump control system is obtained which is suitable for the pressurized water pump system installed in an environment where the factor of outside air temperature change variations is mainly influential.

(4) If the seasonal change input signal is used as the external input signal, a pump control system is obtained which is suitable for the pressurized water pump system installed in an environment where the factor of seasonal change variations is mainly influential.

(5) If the load change input signal is used as the external input signal, a pump control system is obtained which is suitable for the pressurized water pump system installed in an environment where the factor of load change variations is mainly influential.

(6) If the load availability factor change input signal is used as the load change input signal, a pump control system is obtained which is suitable for the pressurized water pump system installed in an environment where the factor of load availability factor change variations is mainly influential.

(7) In the proposed system, a controller of secondary supply pumps is provided which contains the input-output processing portion that determines the rotational frequency of the above-mentioned inverters so that the discharge pressure from the secondary supply header is a prescribed constant discharge pressure for a prescribed period from the start of operation.

Accordingly, even if supply pressure P1 from secondary supply pumps that is a result of predictive calculation of pipeline resistances is low, a pump control system of better performance is obtained which does not stabilize at a water flow lower than the required water flow, thus preventing the possibility of stabilization at a lower flow rate.

Also, startup operation of a pressurized water pump system can be established earlier.

(8) In the proposed system, controller 22 of secondary supply pumps is provided which contains input-output processing portion 221 that determines the rotational frequency of the above-mentioned inverters so that a prescribed amount of pressure is added to discharge pressure P1 from the secondary supply header for a prescribed period at every prescribed time interval.

Accordingly, even if supply pressure P1 from secondary supply pumps that is a result of predictive calculation of pipeline resistances is low, a pump control system of better performance is obtained which does not stabilize at a water flow lower than the required water flow, thus preventing the possibility of stabilization at a lower flow rate.

(9) Since monitor signal input portion 23 which inputs monitor input signals to input-output processing portion 221, a monitor display portion and a data memory portion are provided, monitor input and monitor data storage become easy, and thus an easily adjustable pump control system is obtained.

(10) Since operation display portion 222 that displays the operating status is provided in controller 22, a pump control system in which the operating status of controller 22 can easily be understood is obtained.

(11) Since primary external communication portion 223 that displays the operating status in a remote place via remote communication means 24 is provided in controller 22, the operating status of controller 22 can easily be understood in a remote place, and thus a pump control system that can save labor and manpower is obtained.

(12) Since secondary external communication portion 224 that can change the settings of parameters required for operation from a remote place via remote communication means 24 is provided in controller 22, remote control of controller 22 is made possible, and thus a pump control system that can save labor and manpower for adjustment is obtained.

Although it is described that the Internet is used for remote communication means 24 in the above embodiment, the means is not restricted to this but, for example, telephone lines can also be directly used. In short, any communication means can be used provided it can send signals to remote places.

In addition, the above description merely shows a specific suitable embodiment for the purpose of illustrating and indicating examples of the present invention. Consequently, the present invention is not restricted to the above embodiment, and may be embodied with further changes and variations without departing from the spirit or essential characteristics thereof.

As described above, the following effects are obtained according to embodiment 1 of the present invention.

(1) A pump control system that can ensure a highly accurate energy-saving system is obtained, because a controller of secondary supply pumps is provided which has an input-output processing portion determining the rotational frequency of the inverters by selecting numerical values of fixed resistance K0 of the entire system, pipeline constants K1 and K2, and the constant n determined from the formula of head of friction loss based on an external input signal or tables in the data storage portion 225, and calculating a supply pressure using the above numerical values and a signal obtained by the measurement with a flow sensor.

(2) Since the proposed system only requires increasing an input-output processing portion, a monitor signal input portion, a monitor display portion, a data memory portion, an operation display portion, etc. and can utilize the existing controller for controlling the number of operating pumps for extending a conventional pump control system, a low-cost pump control system whose extension can easily be done is obtained.

(3) A pump control system is obtained which is suitable for the pressurized water pump system installed in an environment where the factor of outside air temperature change variations is mainly influential.

(4) A pump control system is obtained which is suitable for the pressurized water pump system installed in an environment where the factor of seasonal change variations is mainly influential.

(5) A pump control system is obtained which is suitable for the pressurized water pump system installed in an environment where the factor of load change variations is mainly influential.

(6) A pump control system is obtained which is suitable for the pressurized water pump system installed in an environment where the factor of load availability factor change variations is mainly influential.

(7) In the proposed system, a controller of secondary supply pumps is provided which contains the input-output processing portion that determines the rotational frequency of the above-mentioned inverters so that the discharge pressure from the secondary supply header is a prescribed constant discharge pressure for a prescribed period from the start of operation.

Accordingly, startup operation of a pressurized water pump system can be established earlier.

(8) In the proposed system, a controller of secondary supply pumps is provided which contains the input-output processing portion that determines the rotational frequency of the above-mentioned inverters so that a prescribed amount of pressure is added to the discharge pressure from the secondary supply header for prescribed period at even prescribed time interval.

Accordingly, even if the secondary pump supply pressure that is a result of predictive calculation of pipeline resistances is low, a pump control system of better performance is obtained which does not stabilize at a water flow lower than the required water flow, thus preventing the possibility of stabilization at a lower flow rate.

(9) Since a monitor signal input portion which inputs monitor input signals to the input-output processing portion, a monitor display portion and a data memory portion are provided, monitor input and monitor data storage become easy, and thus an easily adjustable pump control system is obtained.

(10) Since an operation display portion that displays the operating status is provided in the controller of secondary supply pumps, a pump control system is obtained in which the operating status of the controller of secondary supply pumps can easily be understood.

(11) Since a primary external communication portion that displays the operating status in a remote place via the remote communication means is provided in the controller of secondary supply pumps, the operating status of the controller of secondary supply pumps can easily be understood in a remote place, and thus a pump control system that can save labor and manpower is obtained.

(12) Since a secondary external communication portion that can change the settings of parameters required for operation from a remote place via the remote communication means is provided in the controller of secondary supply pumps, remote control of the controller of secondary supply pumps is made possible, and thus a pump control system that can save labor and manpower for adjustment is obtained.

Accordingly, a pump control system that has an electric energy-saving effect can be realized.

(Embodiment 2)

Figure 5:
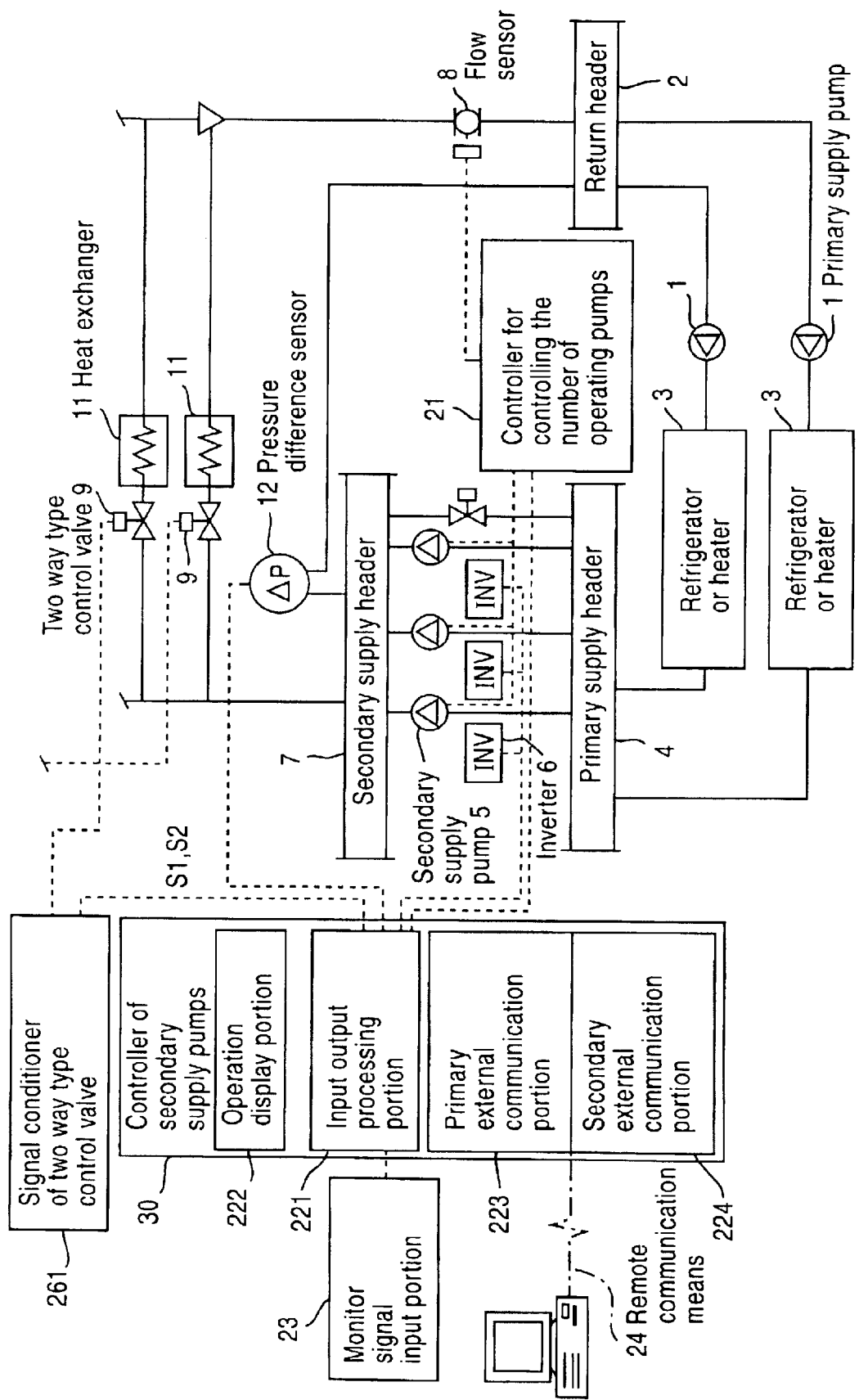
[FIG. 5]

FIG. 5 is a drawing illustrating an essential part of the configuration of a pump control system in another embodiment of the present invention.

Figure 6:
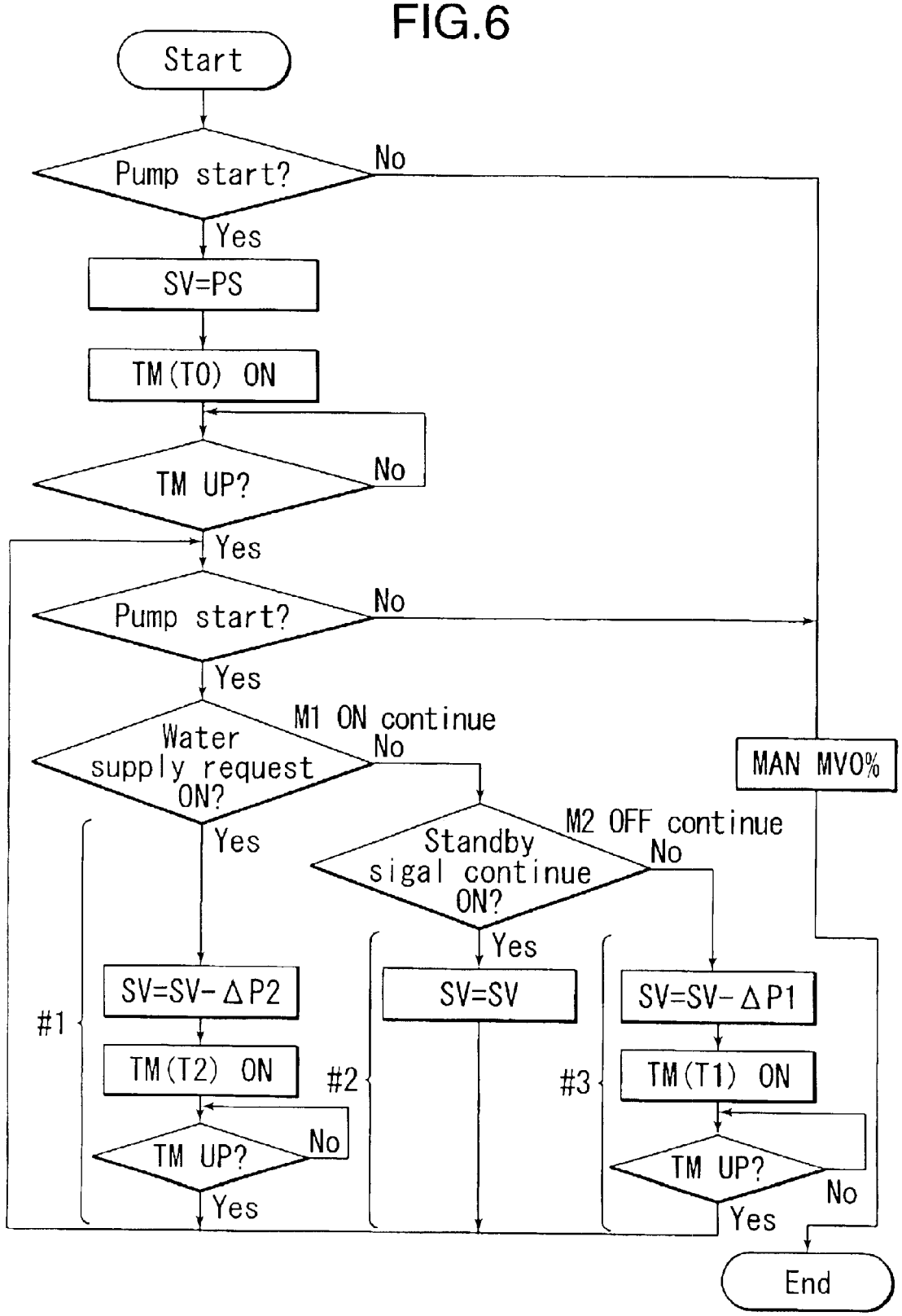
[FIG. 6]

FIG. 6, FIG. 7 and FIG. 8 are drawings respectively illustrating operations of the invention shown in FIG. 5. This embodiment shows a pump control system used for an air-conditioning system.

In these figures, components having the same symbols as those shown in the drawings illustrated above represent the same functions respectively.

In the following, only the parts different from the drawings illustrated above will be described.

Controller 30 of secondary supply pumps contains input-output processing portion 221 that controls the rotational frequency of inverters 6 using the signal for two-way type control valves 9 opening and the value measured by pressure difference sensor 12.

Signal conditioner 261 converts the signal to be given to two-way type control valves 9.

Next, operation of such configured system of the present invention will be described.

FIG. 6 indicates a flow chart, and FIG. 7 indicates the relationship between water supply request signal S1, standby request signal S2, open rate V1 of the two-way type control valves 9, pressure set value P of the pressure difference sensor 12, and the flow chart shown in FIG. 6.

In FIG. 6 and FIG. 7, #1 indicates a supply water flow increasing loop, #2 indicates a constant supply water flow loop, and #3 a supply water flow decreasing loop.

Also, in FIG. 7, the vertical axes indicate the open rate V1 of two-way type control valves 9 and the pressure set value P of pressure difference sensor 12 respectively and the horizontal axes indicate time t1 and t2 respectively.

Operation is started at the initial value PS of pressure set value SV at the startup of secondary supply pumps 5.

After the effect waiting time T0 has elapsed, whether water supply request signal S1 is present is checked.

If the checking result is 'YES,' pressure set value SV is raised by ΔP2.

If the checking result is 'NO,' whether standby request signal S2 is present is checked.

If the checking result is 'YES,' pressure set value SV is not changed.

If the checking result is 'NO,' pressure set value SV is lowered by ΔP1.

After the effect waiting time T2 has elapsed, the operation is returned again to the signal checking loop.

Then the above actions are repeated.

On the other hand, presence or absence of water supply request signal S1 and standby request signal S2 determines the pressure set value SV.

PID operation is carried out in input-output processing portion 221 using the difference between this pressure set value SV and the differential pressure signal from pressure difference sensor 12, and the rotational frequency control signal for inverters 6 is output.

If the monitor input is used, the monitor input signal is input from monitor signal input portion 23, data are stored in the data memory portion and at the same time trend-graphs and numerical values, etc. are indicated in the monitor display portion.

In the case of remote control, the monitor input signal and various parameter values are monitored in external operation terminal 25 located in a remote place after passing through remote communication means 24 from the primary and secondary external communication portions, and at the same time external operation terminal 25 changes the settings for the values to be set.

As a result;

As shown in FIG. 8, for instance, an example of conventional systems shown in FIG. 1 employs control at constant differential pressure and the operating point moves as shown by a, b, c, . . . .

In contrast with the above, the operation point in the present invention moves as shown by A, B, C, . . . .

Since brake power W ∝ water flow rate Q×head H,

A pump control system, having more remarkable power-saving effect than conventional constant rotational frequency control systems is obtained.

In FIG. 8, G1 shows the head curve of secondary supply pumps 5 and, in this case, this curve is for that of three pumps combined.

Also, G2 shows a pipe resistance curve.

Accordingly, (1) Due to the provision of controller 30 of secondary supply pumps that contains input-output processing portion 221 which controls the rotational frequency of inverters 6 using the open rate signal of two-way type control valves 9 and the signal obtained by the measurement with pressure difference sensor 12, adjustment can be done so that the minimum necessary supply water flow and pump head are obtained on the direct use side and thus a pump control system having remarkable power-saving effect is obtained.

(2) Since the proposed system only requires increasing the number of input-output processing portions 221 and can utilize the existing controller for controlling the number of operating pumps 21 for extending conventional pump control systems, a low-cost pump control system whose extension can easily be done is obtained.

(3) Since monitor signal input portion 23 which inputs the monitor input signal to input-output processing portion 221, the monitor display portion and the data memory portion are provided, monitor input and monitor data storage become easy, and thus an easily adjustable pump control system is obtained.

(4) Since operation display portion 222 that displays the operating status is provided in controller 30, a pump control system is obtained in which the operating status of controller 30 can easily be understood.

(5) Since primary external communication portion 223 that displays the operating status in a remote place via remote communication means 24 is provided in controller 30, the operating status of controller 30 can easily be understood in a remote place, and thus a pump control system that saves labor and manpower is obtained.

(6) Since secondary external communication portion 224 that can change the settings of parameters required for operation from a remote place via remote communication means 24 is provided in controller 30, remote control of controller 30 is made possible, and thus a pump control system that can save labor and manpower for adjustment is obtained.

Although it is described that the Internet is used for remote communication means 24 in the above embodiment, the means is not restricted to this but, for example, telephone lines can also be directly used. In short, any communication means can be used provided it can send signals to remote places.

In addition, the above description merely shows a specific suitable embodiment for the purpose of illustrating and indicating examples of the present invention. Consequently, the present invention is not restricted to the above embodiment, and may be embodied with further changes and variations without departing from the spirit or essential characteristics thereof.

As described above, the following effects are obtained according to embodiment 2 of the present invention:

(1) Due to the provision of the controller of secondary supply pumps that contains an input-output processing portion which controls the rotational frequency of inverters using the open rate signal of two-way type control valves and the signal obtained by the measurement with a pressure difference sensor, adjustment can be done so that the minimum necessary supply water flow and pump head are obtained on the direct use side and thus a pump control system having remarkable power-saving effect is obtained.

(2) Since the proposed system only requires increasing an input-output processing portion, a monitor signal input portion, a monitor display portion, a data memory portion, and an operation display portion, etc. and can utilize the existing controller for controlling the number of operating pumps for extending conventional pump control systems, a low-cost pump control system whose extension can easily be done is obtained.

(3) Since the monitor signal input portion which inputs the monitor input signal to the input-output processing portion, the monitor display portion and the data memory portion are provided, monitor input/output and monitor data storage become easy, and thus an easily adjustable pump control system is obtained.

(4) Since an operation display portion that displays the operating status is provided in the controller of secondary supply pumps, a pump control system is obtained in which the operating status of the controller of secondary supply pumps can easily be understood.

(5) Since a primary external communication portion that displays the operating status in a remote place via the remote communication means is provided in the controller of secondary supply pumps, the operating status of the controller of secondary supply pumps can easily be understood in a remote place, and thus a pump control system that can save labor and manpower is obtained.

(6) Since a secondary external communication portion that can change the settings of parameters required for operation from a remote place via the remote communication means is provided in the controller of secondary supply pumps, remote control of the controller of secondary supply pumps is made possible, and thus a pump control system that can save labor and manpower for adjustment is obtained.

Accordingly, a pump control system that has an electric energy-saving effect can be realized.

What is claimed is:

1. A pump control system for pressurized water supply systems comprising:

primary supply pumps that supply chilled water or hot water from a return header to a primary supply header via refrigerators, heat pump chillers, or boilers;

secondary supply pumps that are provided with inverters and supply chilled water or hot water from said primary supply header to a secondary supply header;

a flow sensor that measures the flow from said secondary supply header to said return header;

a pressure difference sensor that measures the pressure difference between said secondary supply header and said return header; and a controller of the secondary supply pumps that determines a supply pressure from the secondary supply pumps using a flow rate measured with said flow sensor, carries out prescribed calculations based on this supply pressure and a discharge pressure measured with said pressure difference sensor, and outputs a control signal corresponding to the calculated result to said inverters.

2. A pump control system in accordance with claim 1, wherein said controller determines the supply pressure from the secondary supply pumps by substituting a flow rate value measured with said flow sensor for the formula containing the flow rate as a variable.

3. A pump control system in accordance with claim 1, wherein said controller outputs the rotational frequency control signal corresponding to the result of calculation to said inverters.

4. A pump control system for pressurized water supply systems comprising:

primary supply pumps that supply chilled water or hot water from a return header to a primary supply header via refrigerators, heat pump chillers, or boilers;

secondary supply pumps that are provided with inverters and supply chilled water or hot water from said primary supply header to a secondary supply header;

a flow sensor that measures the flow from said secondary supply header to said return header;

a pressure difference sensor that measures the pressure difference between said secondary supply header and said return header; and a controller of the secondary supply pumps that contains an input-output processing portion which determines said inverter rotational frequency by performing calculations, based on said discharge pressure measured with said pressure difference sensor and a supply pressure calculated by selecting the fixed resistance K0 of the entire system, pipeline constants K1 and K2, and a constant n determined using the formula of head of friction loss using a signal obtained by the measurement with said flow sensor and an external input signal or using tables in the data storage portion.

5. A pump control system in accordance with claim 4, wherein the outside air temperature input signal is used as said external input signal.

6. A pump control system in accordance with claim 4, wherein the seasonal change input signal is used as said external input signal.

7. A pump control system in accordance with claim 4, wherein the load change input signal is used as said external input signal.

8. A pump control system in accordance with claim 7, wherein the load availability factor change input signal is used as said load change input signal.

9. A pump control system in accordance with any one of claims 1 to 8, wherein said controller contains an input-output processing portion that determines said inverter rotational frequency so that the discharge pressure from said secondary supply header is a prescribed constant discharge pressure for a prescribed period from the start of operation.

10. A pump control system in accordance with any one of claims 1 to 8, wherein said controller contains an input-output processing portion that determines said inverter rotational frequency so that the discharge pressure from said secondary supply header is increased by a prescribed value for a prescribed period at every prescribed time interval.

11. A pump control system in accordance with any one of claims 4 to 8, wherein a monitor signal input portion that inputs monitor input signals into said input-output process ing portion, a monitor display portion and a data memory portion are provided.

12. A pump control system in accordance with any one of claims 1 to 8, comprising an operation display portion that is provided in said controller and displays the operating status.

13. A pump control system in accordance with any one of claims 1 to 8, comprising a primary external communication portion that is provided in said controller and displays the operating status in a remote place via the remote communication means.

14. A pump control system in accordance with any one of claims 1 to 8, comprising a secondary external communication portion that is provided in said controller and changes the settings of parameters necessary for operation from a remote place via the external communication means.

* * * * *